United States Patent
Tzeng

(10) Patent No.: US 7,427,853 B2
(45) Date of Patent: Sep. 23, 2008

(54) SOFT-START CIRCUIT FOR A DC-TO-DC CONVERTER

(75) Inventor: Yu-En Tzeng, Sunnyvale, CA (US)

(73) Assignee: VIA Technologies, Inc., Taipei (TW)

( * ) Notice: Subject to any disclaimer, the term of this patent is extended or adjusted under 35 U.S.C. 154(b) by 208 days.

(21) Appl. No.: 11/424,447

(22) Filed: Jun. 15, 2006

(65) Prior Publication Data

US 2007/0002595 A1    Jan. 4, 2007

Related U.S. Application Data

(60) Provisional application No. 60/691,981, filed on Jun. 16, 2005.

(51) Int. Cl.
*G05F 1/40* (2006.01)
(52) U.S. Cl. ........................ 323/282; 323/283
(58) Field of Classification Search ......... 323/282–288, 323/351, 222
See application file for complete search history.

(56) References Cited

U.S. PATENT DOCUMENTS 7,030,596 B1 *    4/2006    Salerno et al. .............. 323/282

FOREIGN PATENT DOCUMENTS

JP    2004297985    10/2004

\* cited by examiner

*Primary Examiner*—Rajnikant B Patel
(74) *Attorney, Agent, or Firm*—James W. Huffman; Anthony Diepenbrock

(57) ABSTRACT

A switching power regulator for performing DC-to-DC conversion may be implemented with a soft-start circuit configured to ensure orderly power-up of the switching power regulator by controlling the maximum output current delivered to a load while maintaining proper voltage regulation during start-up. The soft-start circuit may use combinations of reference voltages generated by a reference voltage digital-to-analog converter and a programmable width burst-pulse to control an output voltage of the switching power regulator during start-up without requiring external components. The soft-start circuit may provide burst-pulses directly to a drive circuit configured in the switching power regulator to control the output voltage of the switching power regulator, thereby beginning to ramp up the output voltage of the switching power regulator from zero volts. A specified number of clock cycles after the output voltage has reached a specified value, the soft-start circuit may switch control of the drive circuit from the burst pulses to regular PWM or PFM operating modes.

20 Claims, 7 Drawing Sheets

SOFT-START CIRCUIT FOR A DC-TO-DC CONVERTER

This application claims benefit of priority of U.S. provisional application Ser. No. 60/691,981 titled "Softstart Circuit for a DC to DC Converter", invented by Yu-En Tzeng and filed on Jun. 16, 2005, which is hereby incorporated by reference as though fully and completely set forth herein.

BACKGROUND OF THE INVENTION

1. Field of the Invention

This invention relates to soft-start circuits used in switching power regulators, and more particularly to soft-start circuits using combinations of reference voltages and programmable width burst pulses for controlling output voltages of switching power regulators during start-up.

2. Description of the Related Art

One type of switching power regulator often used to perform DC-to-DC voltage conversion is a step-down regulator, which generally operates to convert a higher voltage (e.g. 12V) to a lower value as required by one or more load devices. Switching power regulators often use two or more power transistors to perform the input voltage to output voltage conversion. One common example of such a switching power regulator, commonly called a "Buck regulator", implemented with MOS devices is shown in FIG. 1a. Regulator 100 may be configured to operate in either PWM (pulse width modulation) mode or PFM (pulse-frequency modulation) mode, switching a P-channel device 107 and an N-channel device 109 in order to produce a square-wave at their common node LX. The produced square-wave can be smoothed out using an LC circuit comprising inductor 111 and load capacitor 113 to produce a desired output voltage, Vout. A control loop, comprised of an error amplifier 115 and a control logic block 101 can be configured to control the output square-wave, thereby controlling switching P-channel device 107 and N-channel device 109, and hence the resulting value of Vout. In general, P-channel device 107 and N-channel device 109 are controlled such that they do not conduct current at the same time. Typically, when P-channel device 107 is turned on (Vg_P is logic 0), N-channel device 109 is turned off (Vg_N is logic 0), and when P-channel device 107 is turned off (Vg_P is logic 1), N-channel device 109 is turned on (Vg_N is logic 1). $I_L$ represents the load current flowing in inductor 111. When operating in PFM mode, P-channel device 107 is turned on at a frequency and duty cycle that is a function of an input voltage Vin, the output voltage Vout, and the value of inductor 111. While in PFM mode, N-channel device 109 is turned off to optimize efficiency by reducing gate charge dissipation. Vout is regulated by skipping switching cycles that turn on P-channel device 107.

In order to maintain proper operation of a load device coupled to regulator 100, and often to limit an input current developed in regulator 100 while charging load capacitor 113, Vout is typically ramped from its initial value (called its pre-bias value) to a desired output voltage at a controlled rate. This rate may be chosen as required by the load device and the designed maximum input current allowed for charging load capacitor 113. Often, the pre-bias value is at or near 0 volts. If that is the case, regulator 100 generally attempts to ramp its output $V_{out}$ from 0V to the desired voltage in a predetermined amount of time. Therefore, some switching power regulators also include soft-start circuits to limit input current during start-up. For example, Texas Instruments' TPS6205x synchronous step-down regulator features an internal soft-start circuit that limits the inrush current during start-up to prevent possible voltage drops of the input voltage if a battery or a high impedance power source is connected to the input. The soft-start circuit within the TPS6205x is implemented as a digital circuit increasing the switch current in steps of 200 mA, 400 mA, 800 mA, and then the typical switch current limit of 1.2 A. A typical start-up time with a 22 µF load capacitor and a 200-mA load current would be 1 ms. As a result, however, the start-up time mainly depends on the load capacitor and load current, with the regulator requiring an extra pin for the external components.

Many other problems and disadvantages of the prior art will become apparent to one skilled in the art after comparing such prior art with the present invention as described herein.

SUMMARY OF THE INVENTION

In one set of embodiments, a switching power regulator for performing DC-to-DC (DC-DC) voltage conversion may be implemented with a soft-start circuit configured to ensure orderly power-up of the switching power regulator by controlling the maximum output current delivered to a load while maintaining proper voltage regulation during start-up. In one embodiment, the soft-start circuit uses a combination of a reference signal generated by a reference voltage DAC and a programmable width burst-pulse to control the output of the switching regulator during power-up.

The soft-start circuit may provide limits to the inrush current during start-up, in both PWM and PFM modes, without requiring external components. In one set of embodiments the soft-start circuit may operate to provide burst-pulses directly to the drive circuit configured to control the output devices (such as PMOS device 107 and NMOS device 109 in FIG. 1a) in the switching regulator, thereby beginning to ramp up the voltage output of the regulator from zero volts. A specified/determined number of clock cycles (e.g. 8 cycles in certain embodiments) after the output voltage reaches a specified/predetermined value (e.g. 200 mV in some embodiments), the soft-start circuit may switch control of the drive circuit from the burst pulses to regular PWM or PFM operating modes. The specified/determined voltage value may be implemented as an internal reference voltage generated using a reference voltage DAC (digital-to-analog converter). Once in regular operating mode (PWM or PFM), the reference voltage DAC may also be used to control the ramp up of additional voltage reference signals used during regular mode of operation. The specified value for the internal voltage reference may be chosen such that each burst-pulse is capable of providing sufficient current to ramp up the output voltage. The width of the burst-pulse may be controlled by implementing a programmable pulse width generating circuit, setting the width of the burst-pulse to allow for enough current to ramp up the output voltage without the value of the inrush current reaching levels that may cause possible voltage drops of the input voltage.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
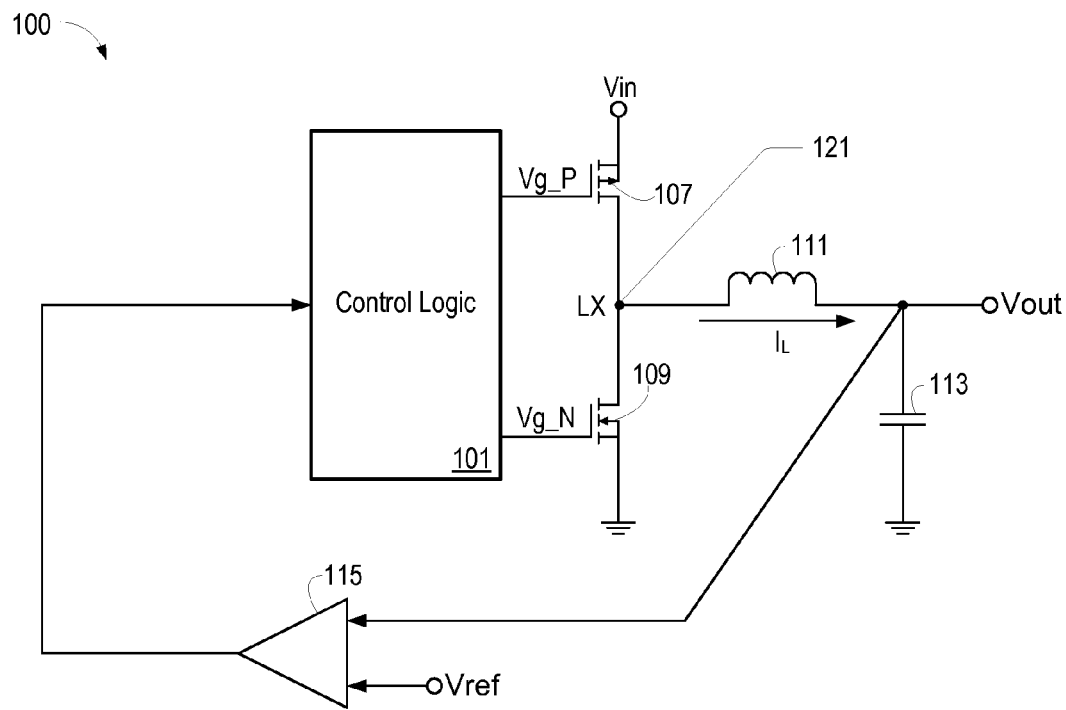
FIG. 1a shows a basic embodiment of a DC-DC switching power regulator configured with an inductor and a load capacitor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

As used herein, the expressions "normal operating mode" and "regular operating mode" are intended to mean the same thing and are used interchangeably.

Figure 1B:
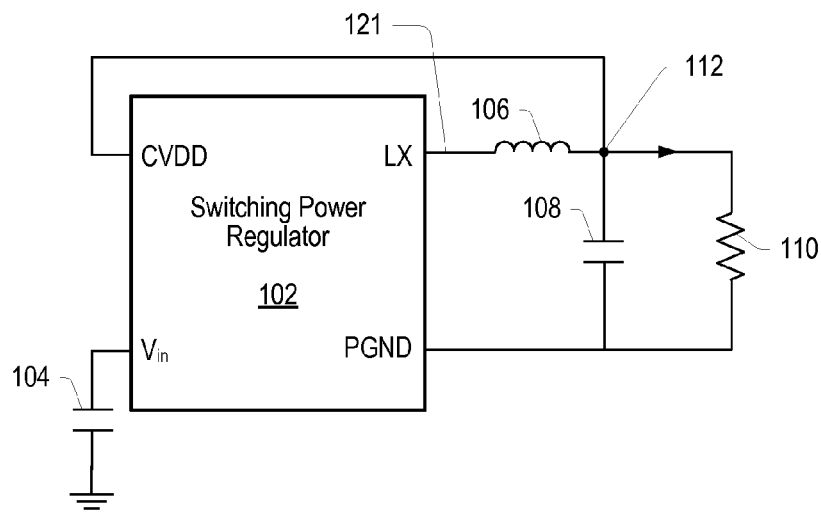
FIG. 1b shows a basic embodiment of a DC-DC switching power regulator configured with a soft-start circuit.

Referring now to FIG. 1, a basic embodiment of a DC-to-DC switching power regulator 102 configured with an inductor 106 and load capacitance 108 (plus resistive load 110) is shown, with the output at node 112 coupled in a feedback loop to control-supply voltage CVDD, which may be used by a soft-start circuit configured within switching power regulator 102 to control the output voltage at node 112—and the inrush current into switching power regulator 102—during start-up. A capacitor 104 may be used to couple the input voltage $V_{in}$ to ground. In certain embodiments, the value of capacitor 104 may be around 1 μF, for input voltage values ranging from 3V to 4.2V. A partial block diagram of one embodiment of switching power regulator 102 configured with a soft-start circuit according to one embodiment of the present invention is shown in FIG. 2.

Figure 2:
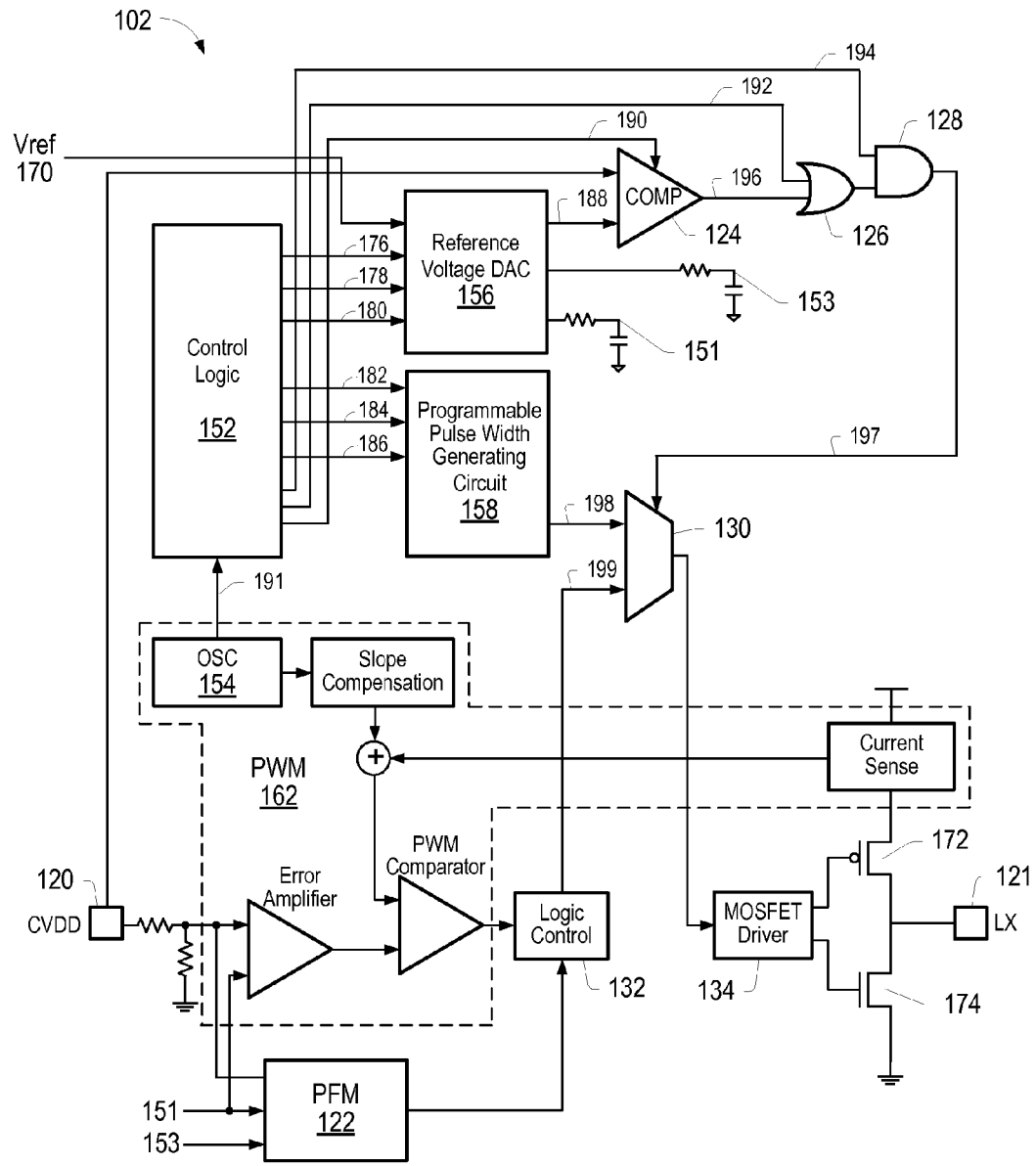
FIG. 2 shows a partial block diagram of the switching power regulator configured with a soft-start circuit shown in FIG. 1b, according to one embodiment of the present invention.

It should be noted that the logic diagram of the embodiment of switching power regulator 102 shown in FIG. 2 is in no way meant to be interpreted as a complete diagram, and the components that do appear in FIG. 2 are either included in the soft-start circuit, or are meant to provide a context for the operation of the soft-start circuit. In the embodiment of FIG. 2, switching power regulator 102 is shown to include PWM control circuitry 162, PFM control circuitry 122, a MOSFET (metal-oxide semiconductor field effect transistor) driver 134 for driving switching transistors 172 and 174, and soft-start circuitry that includes control logic 152, reference voltage DAC 156, comparator 124, programmable pulse width generating circuit 158, and multiplexer 130. As previously mentioned, various embodiments of switching power regulator 102 may include ancillary logic and/or circuitry in accordance with the principles of the present invention.

Control logic 152 may be configured to control/direct the soft-start sequence, and generate signals that control reference voltage DAC 156, programmable pulse width generating circuit 158, and select signal 197 of multiplexer 130. Reference voltage DAC 156 may be configured to generate internal reference voltage 188 from a reference voltage (Vref) 170, providing internal reference voltage 188 as a first input into comparator 124. Comparator 124 may compare internal reference voltage 188 against a present value of CVDD 120 (which may correspond to the output of switching power regulator 102 at node 112, shown in FIG. 1b). The output signal 196 of comparator 124 may therefore indicate when the value of CVDD 120 has reached the value of internal reference voltage 188. Multiplexer 130 may be configured to select which control signal is routed to MOSFET driver 134 to control PMOS device 172 and NMOS device 174. A first input into multiplexer 130 may be a burst-pulse 198 generated by programmable pulse width generating circuit 158. A second input may be a logic control signal 199 generated by logic control 132 during regular operation in either PWM mode or PFM mode. The select signal of multiplexer 130 may be based on the output signal 196 of comparator 124. During start-up, if the value of CVDD 120 is below the value of internal reference voltage 188 and start-up has not yet timed out (timeout signal 192 generated by control logic 152 is deasserted), the output of OR gate 126 will be deasserted, leading to the output of AND gate 128 also being deasserted, and multiplexer 130 will select burst-pulse 198 generated by programmable pulse width generating circuit 158 as the control signal for MOSFET driver 134.

When start-up times out and/or the value of CVDD 120 reaches the value of internal reference voltage 188, the output of OR gate 126 will be asserted. A specified number of clock cycles after the value of CVDD 120 reaches the value of internal reference voltage 188, control logic 152 may assert start-up sync signal 194, causing the output of AND gate 128 to be asserted, causing multiplexer 130 to select logic control signal 199 as the control signal for MOSFET driver 134 for normal PWM or PFM operating mode. Reference voltage DAC 156 may be configured to also generate additional reference voltage signals 151 and 153 used by PWM control circuitry 162 and PFM control circuitry 122 during regular operation. In one embodiment, additional reference voltage signals 151 and 153 are both programmable. In other embodiments, internal reference voltage 188 may also be programmable. Once switching power regulator 102 is in normal operating mode (PWM or PFM), control logic 152 may operate to ramp up additional reference voltage signals 151 and 153. In one set of embodiments, logic control 152 may be configured to receive clock signal 191 from oscillator 154, which is used in PWM control circuit 162. In alternate embodiments, logic control 152 may be configured to operate based on another related clock signal.

Figure 3:
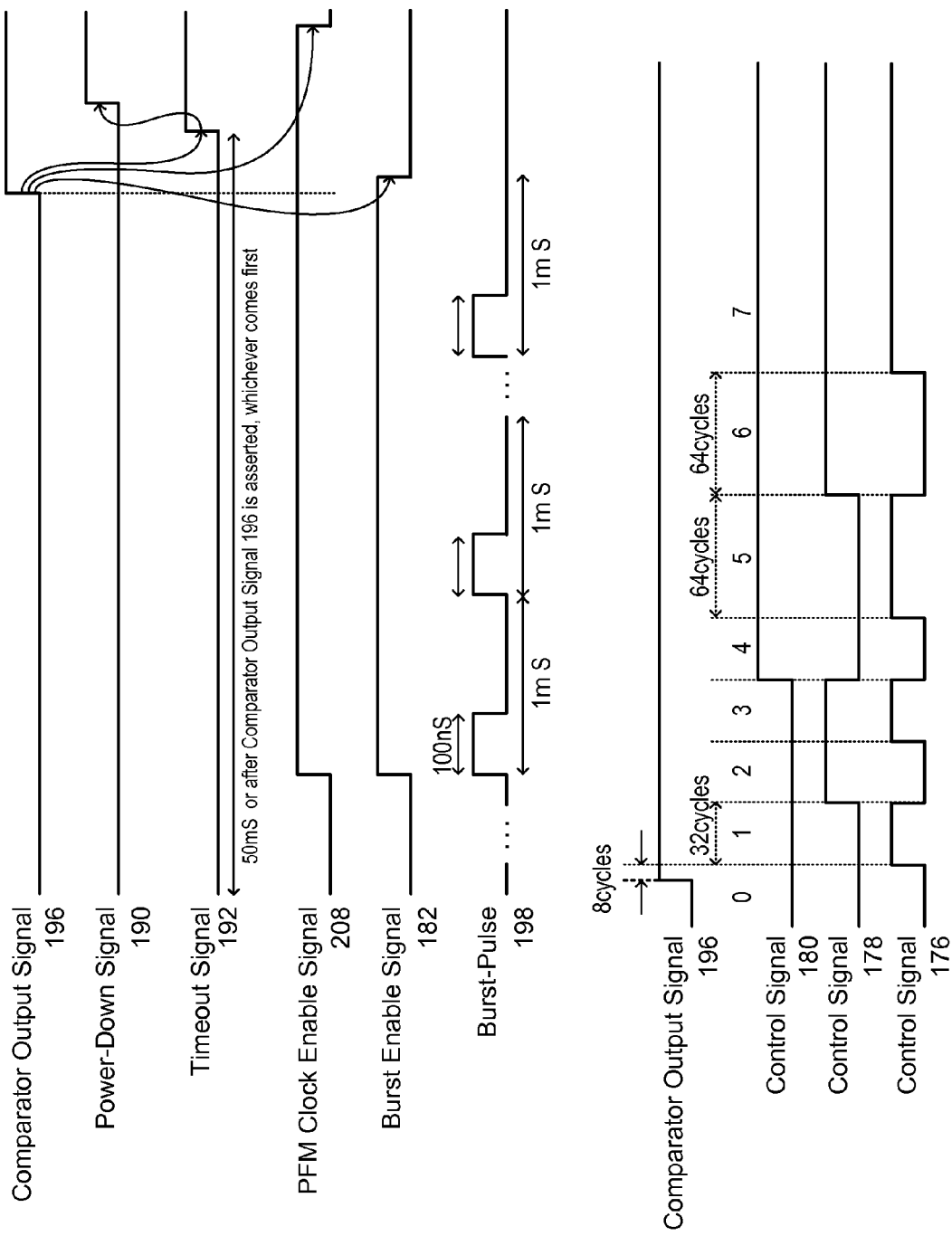
FIG. 3 shows a set of timing diagrams partially illustrating the operation of the embodiment shown in FIG. 2.

FIG. 3 shows a set of timing diagrams illustrating in more detail the partial operation of the embodiment shown in FIG. 2. While output signal 196 of comparator 124 is deasserted (low, in this case), indicating that the value of CVDD 120 is below the value of internal reference voltage 188, and burst enable signal 182 is high, programmable pulse width generating circuit 158 may be generating burst-pulses 198 as shown. In one embodiment, programmable pulse width generating circuit 158 may generate a 100 ns pulse per every 1 ms, corresponding to a duty cycle of 10%. These burst-pulses may be selected by multiplexer 130 to control MOSFET driver 134 and begin to ramp CVDD 120 (and therefore the voltage at LX 121) up from zero volts. A specified number of clock cycles after output 196 of comparator 124 asserts—indicating that the value of CVDD 120 has reached the value of internal reference voltage 188—multiplexer 130 may switch control of MOSFET driver 134 over to control signal 199 generated by logic control 132, resulting in CVDD 120 (LX 121) now being controlled by pulses from either PWM circuitry 162 or PFM control circuit 122 depending on the mode of operation, instead of being controlled by burst-pulses 198.

Timeout signal 192 may be asserted either following assertion of output 196 of comparator 124 or after a specified timeout period has elapsed, whichever occurs first. In one embodiment, in order to ensure that switching regulator 102 eventually enters normal operating mode, timeout signal 192 is asserted 50 ms after start-up has been initiated, if after 50 ms output 196 of comparator 124 still remains deasserted. While the timeout used in this embodiment is 50 ms, alternate embodiments may feature different timeout values (or no timeout at all) depending on desired functionality, and operation of the soft-start circuit is in no way limited to implementing a 50 ms timeout. If output 196 of comparator 124 has asserted before the specified timeout period (50 ms in the embodiment shown) has elapsed, timeout signal 192 may be asserted a specified number of clock cycles after output 196 of comparator 124 asserts. This may allow turning off comparator 124 once it is no longer in use by asserting comparator power-down signal 190, after timeout signal 192 has been asserted. Once switching power regulator 102 is in normal operating mode, burst enable signal 182 may also be deasserted, and control signals 176, 178, and 180 may be used to ramp up reference voltages 151 and 153 for use by PWM control circuit 162 and PFM control circuit 122.

Figure 4:
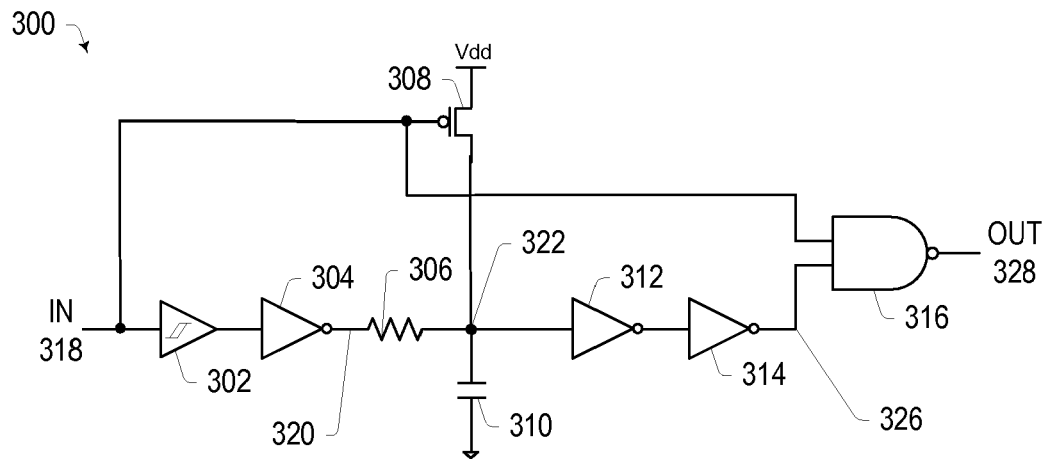
FIG. 4 shows one embodiment of a burst-pulse generating circuit.
Figure 5:
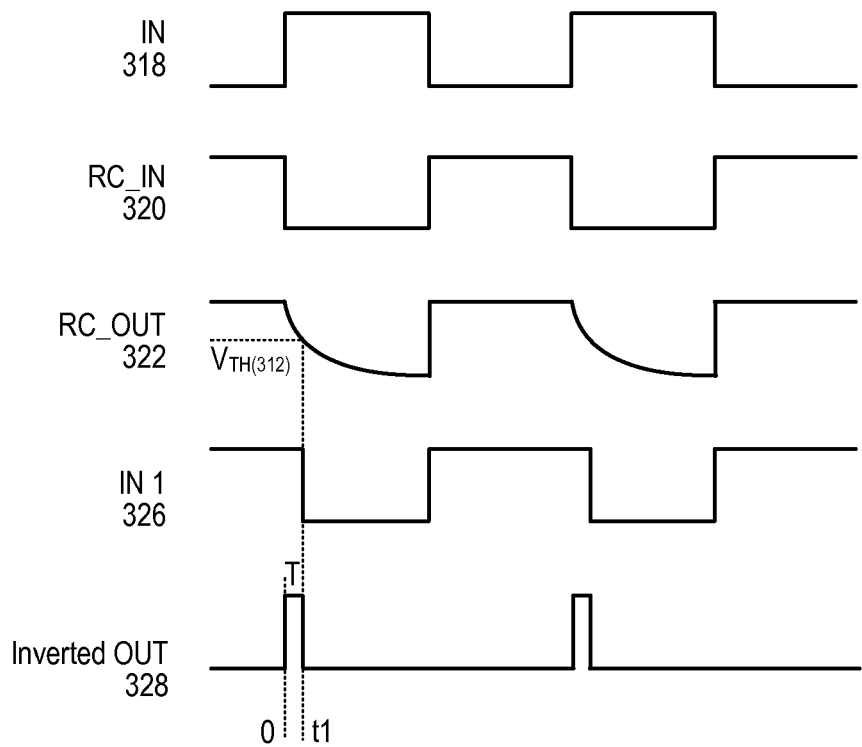
FIG. 5 shows a set of timing diagrams partially illustrating the operation of the burst-pulse generating circuit shown in FIG. 4.

One embodiment of a burst-pulse generating circuit 300 that may be comprised in programmable pulse width generating circuit 158 is shown in FIG. 4. Timing diagrams illustrating operation of burst-pulse generating circuit 300 are shown in FIG. 5. In this embodiment, input 318 is coupled to a Schmitt trigger 302, whose output is coupled to the input of inverter 304. The output of inverter 304 is configured as an input 320 to an RC circuit comprising resistor 306 and capacitor 310, with the output 322 of the RC circuit driving the input of inverter 312. As shown in FIG. 5, when input 318 is deasserted (low, in this case), PMOS device 308 is turned on, and input 320 to the RC circuit is asserted (high, in this case), causing output 322 of the RC circuit to be pulled to the level of the supply voltage Vdd. Output 322 of the RC circuit may drive inverter 312, the output of which may drive inverter 314 to restore the polarity of the signal, asserting input 326 to NAND gate 316, which in turn asserts output 328 of NAND gate 316 (As shown in FIG. 5, output 328 of NAND gate 316 is inverted). When input 318 is asserted (high, in this case), for a brief period of time both inputs to NAND gate 316 will be high, driving output 328 low (again, as shown in FIG. 5, output 328 of NAND gate 316 is inverted). Since asserting input 318 also turns off PMOS device 308, output 322 of the RC circuit will be pulled to ground at a rate dependent on the RC time constant determined by resistor 306 and capacitor 310. When output 322 of the RC circuit reaches the input threshold voltage of inverter 312, the output of inverter 312 will be asserted (go high, in this case), causing input 326 of NAND gate 316 to be deasserted, in turn asserting output 328.

Therefore, the width of each pulse produced in a manner described above—according to the embodiment shown in FIGS. 4 and 5—may be dependent on the input threshold voltage of inverter 312 and the RC time constant determined by resistor 306 and capacitor 310. Referring again to FIG. 5, the voltage at output 322 of the RC circuit may be expressed as:

$$V(t) = A + B * e^{-t/\tau} \quad (1)$$

where τ may represent the time constant determined by resistor 306 and capacitor 310. Equation 1 may be solved for t=0 and t=∞, considering that at t=0 the voltage is at Vdd and at t=∞ the voltage is 0:

$$V(0) = A + B = Vdd \quad (2)$$

$$V(\infty) = A = 0 \quad (3)$$

Thus, equation 1 becomes:

$$V(t) = Vdd * e^{-t/\tau} \quad (4)$$

and $$V(t_1) = Vdd * e^{-t_1/\tau} \quad (5)$$

The width (T) of the burst-pulse may therefore be expressed as:

$$T = t_1 = \tau * \ln\frac{Vdd}{V_{TH(312)}} = RC * \ln\frac{Vdd}{V_{TH(312)}}, \quad (6)$$

where RC corresponds to the value of resistor 306 multiplied by the value of capacitor 310, and $V_{TH(312)}$ corresponds to the input threshold voltage of inverter 312. For example, if resistor 306 has a value of 100 kΩ and capacitor 310 has a value of 1.5 pF, with the input threshold voltage of inverter 312 being 1.95V, the width (T) of the burst-pulse may range from 65ns to 115ns for a supply voltage range of 3V-4.2V.

When determining the possible width of the burst-pulse, a few issues may need to be taken into consideration. If the internal reference voltage (e.g. voltage 188 generated by reference voltage DAC 156) is too high (e.g. 600mV), or the width of the burst-pulse is too short (e.g. less than 100ns), the burst-pulse may not be able to provide enough current to ramp up CVDD 120 (and LX 121). If the width of the burst-pulse is too long (e.g. greater than 350ns), the inrush current may be too large. Making the width of the burst-pulse programmable addresses the issue of the width of the burst-pulse varying according to the respective values of resistor 306 and capacitor 310, the input threshold voltage of inverter 312, and the value of supply voltage Vdd (see equation 6).

Figure 6:
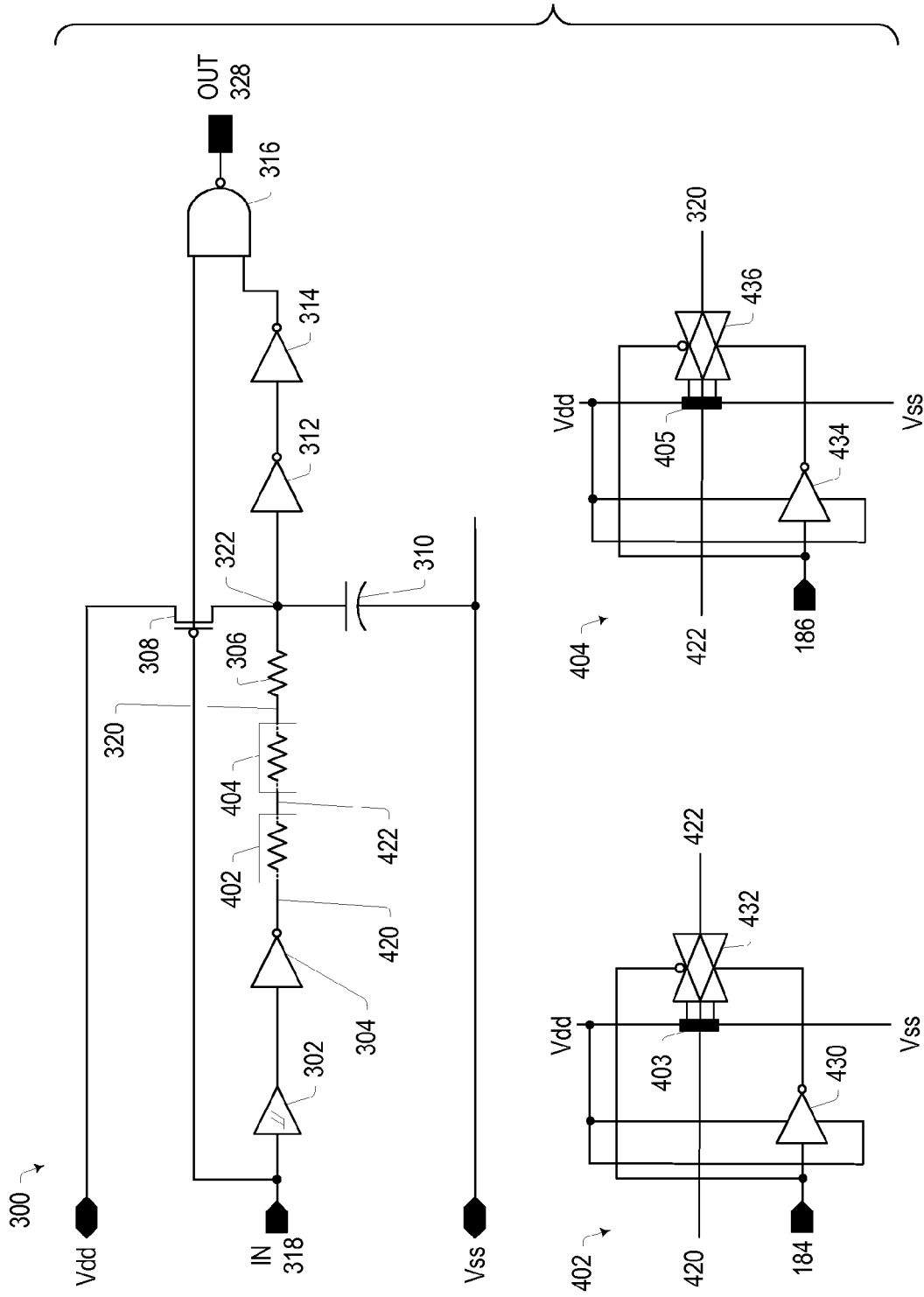
FIG. 6 shows one embodiment of the burst-pulse generating circuit of FIG. 4 implemented with programmable pulse width.

FIG. 6 shows one embodiment of burst-pulse generating circuit 300 implemented with programmable pulse width. Switchable resistance circuits 402 and 404 may be inserted in front of resistor 306 to allow for changing the RC time constant and thus stretching and narrowing the width of the burst-pulse. The resistance between node 420 and node 422 of resistance circuit 402 may be controlled by control signal 184 via transfer gate 432, while the resistance between node 422 and node 320 (which is also the input of the RC circuit in FIG. 4) of resistance circuit 402 may be controlled by control signal 186 via transfer gate 436. During operation of burst-pulse generating circuit 300, when resistance circuits 402 and 404 are both switched out (zero value), only resistor 306 will figure into the time constant, leading to a shorter burst-pulse width. By asserting control signal 184 and/or control signal 186, resistance circuits 402 and/or 404 may be switched into the circuit, effectively increasing the RC time constant and thus stretching the width of the burst-pulse. In one set of embodiments, if output signal 196 of comparator 124 (referring to FIG. 2) is still not asserted after a specified number of clock cycles (e.g. 64 cycles), indicating that the burst-pulse is too narrow to boost CVDD 120, control signal 184 may be asserted to switch in resistance circuit 402 and increase the overall value of the resistance component of the RC time constant by a certain percentage (e.g. 75%). In case output signal 196 of comparator 124 is still not asserted after a specified number of additional clock cycles (e.g. 26 cycles, for a total of 100 cycles), indicating that the burst-pulse is still too narrow to boost CVDD 120, control signal 186 may be asserted to switch in resistance circuit 404 as well, and increase the overall value of the resistance component of the RC time constant by an increased total percentage (e.g. total of 100%). If the width of the burst-pulse is still not long enough to raise CVDD 120, after a specified time period timeout signal 192 may be asserted (see FIG. 3) to place switching power regulator 102 in normal (PWM or PFM) operating mode.

Figure 7:
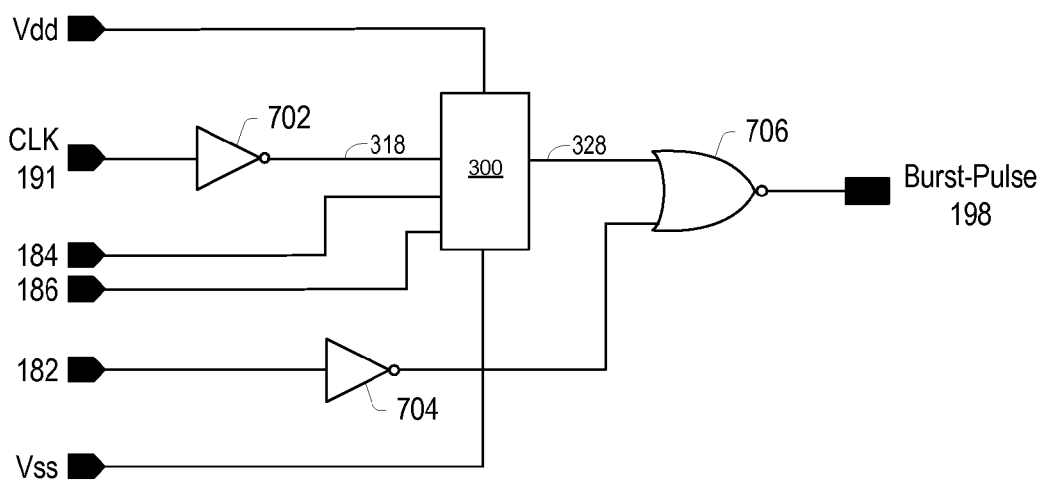
FIG. 7 shows one embodiment of the programmable pulse width generating circuit from FIG. 2 implemented using the burst-pulse generating circuit shown in FIG. 6.

FIG. 7 shows one embodiment of programmable pulse width generating circuit 158 implemented using burst-pulse generating circuit 300. A burst enable signal 182 for programmable pulse width generating circuit 158 may drive inverter 704 to control output 328 from burst-pulse generating circuit 300 being provided via NOR gate 706. Clock signal 191 may be inverted through inverter 702, providing input 318 (not shown in FIG. 2) to burst-pulse generating circuit 300, with control signals 184 and 186 applied for controlling the width of the burst-pulse as previously described.

Figure 8:
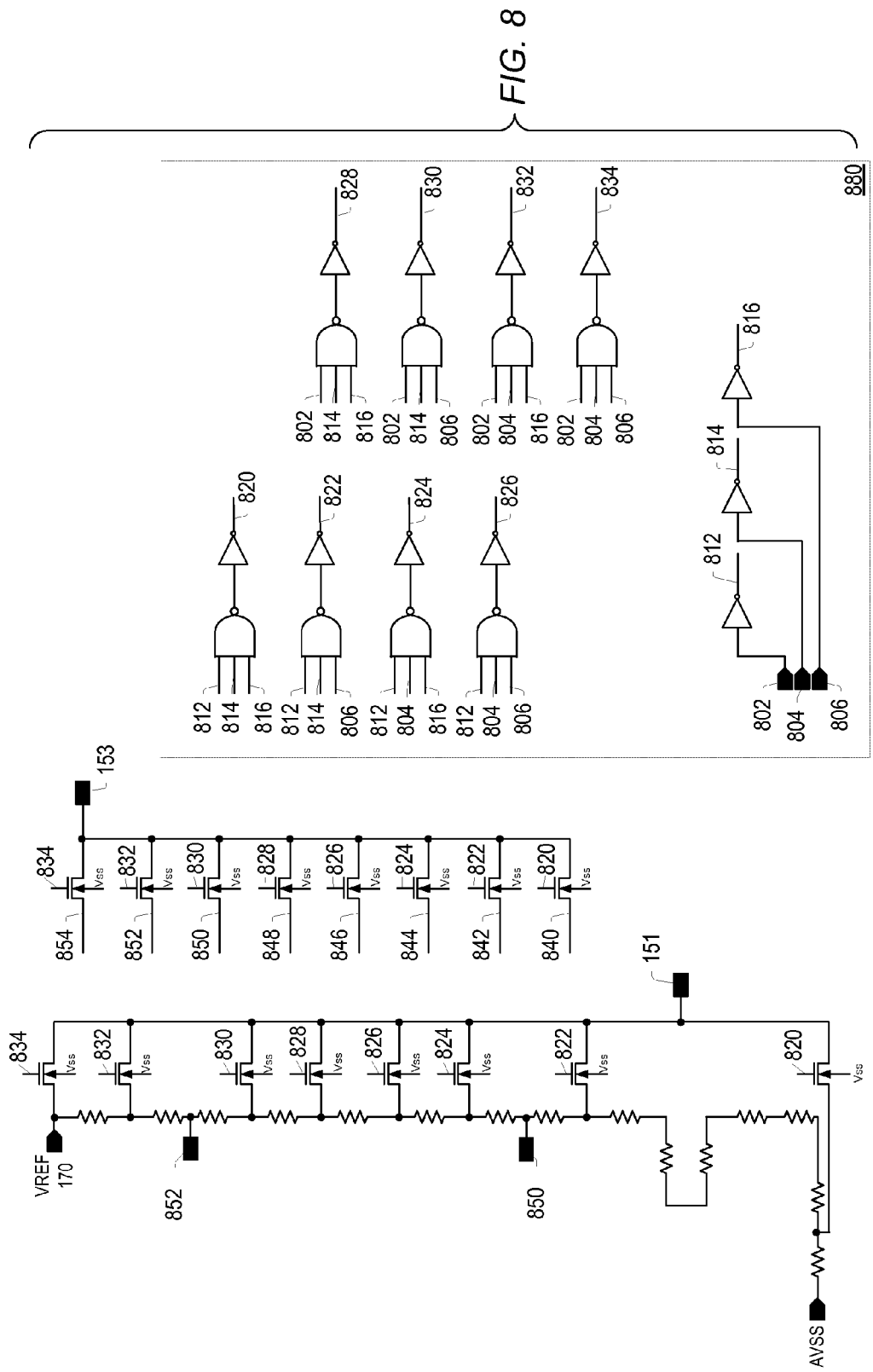
FIG. 8 shows a partial circuit diagram of one embodiment of the reference DAC (digital-to-analog converter) shown in FIG. 2.

FIG. 8 shows a partial circuit diagram of one embodiment of reference voltage DAC 156 shown in FIG. 2. In this embodiment, reference voltage DAC 156 may be implemented as a 3-bit reference voltage DAC configured with a 3-to-8 decoder 880, with outputs 176, 178, and 180 from control logic 152 coupling to control inputs 802, 804 and 806, respectively. Output signals 820-834 from decoder 880 may be used as the gate control signals for pass transistors (NMOS devices in this case), whose channels may couple a voltage from a voltage divider to a common node. Reference voltage 170 may be provided as the voltage from which all other voltage levels are obtained. Referring again to FIG. 3, the timing for ramping up reference voltages 153 and 151 is shown according to one embodiment. It should be noted that the actual values for the number of elapsed clock cycles are shown to illustrate operation of certain preferred embodiments, and the operation of reference voltage DAC 156 is no way limited to the values shown. In alternate embodiments, reference voltages 153 and 151 may be ramped up at different rates using different numbers of cycles. The combination of control signals 176, 178, and 180 may be applied in a manner so as to select higher voltages each time a specified number of clock cycles have elapsed. Although not shown in FIG. 8, reference voltage DAC 156 may also be configured to provide internal reference voltage 188, which may be 200 mV in certain embodiments. In alternate embodiments, a different value may be designated for internal reference voltage 188. In one set of embodiments, reference voltage DAC 156 may be configured to generate and provide one of voltages 0.15V, 0.65V, 0.75V, 0.85V, 0.95V, 1.05V, 1.15V, and 1.2V (which may be reference voltage 170).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A power regulator comprising:
a first node, wherein a first voltage developed at the first node is used to produce an output voltage of the power regulator;
a first transistor having a control terminal, wherein the first transistor is coupled between a first supply voltage and the first node, wherein the first transistor is operable to supply current to the first node when the first transistor is conductive;
a second transistor having a control terminal, wherein the second transistor is coupled between the first node and a second supply voltage; and
a first control circuit coupled to the control terminal of the first transistor and to the control terminal of the second transistor, wherein the first control circuit is operable to generate burst-pulses and use the burst pulses to control the first transistor and the second transistor during start-up of the power regulator to ramp up the output voltage of the power regulator, thereby limiting the current supplied to the first node during start-up;
wherein a width of the burst-pulses is programmable in the first control circuit.

2. The power regulator of claim 1, further comprising:
a first driver circuit coupled between the first control circuit and the control terminal of the first transistor, and operable to receive the burst pulses and to enable the first transistor to be conductive and/or non-conductive; and
a second driver circuit coupled between the first control circuit and the control terminal of the second transistor, and operable to receive the burst pulses and to enable the second transistor to be conductive and/or non-conductive.

3. The power regulator of claim 1, wherein the first control circuit is operable to stop using the burst-pulses to control the first transistor and the second transistor if the output voltage of the power regulator reaches a specified value.

4. The power regulator of claim 1, further comprising a second control circuit coupled to the first control circuit and operable to generate first control signals and provide the first control signals to the first control circuit;
wherein the first control circuit is operable to selectively couple the first control signals to the control terminal of the first transistor and to the control terminal of the second transistor when the first control circuit is not using the burst-pulses to control the first transistor and the second transistor; and
wherein the first control signals operate to control the output voltage of the power regulator.

5. The power regulator of claim 4, wherein the first control circuit is operable to stop generating the burst-pulses a specified time period after the output voltage of the power regulator reaches a specified value.

6. The power regulator of claim 4, wherein the first control circuit is operable to stop generating the burst-pulses from a specified time period after start-up if the output voltage of the power regulator doesn't reach a specified value within the specified time period.

7. A control circuit for controlling a first transistor and a second transistor configured to generate an output voltage of a power regulator, the control circuit comprising:
a first circuit operable to generate burst pulses;

a second circuit operable to generate first control signals; and a third circuit operable to select between the burst pulses and the first control signals;

wherein the third circuit is operable to select the burst pulses to control the first transistor and the second transistor when starting up the power regulator, wherein the burst-pulses operate to ramp up the output voltage of the power regulator while limiting a current delivered by the power regulator; and wherein the third circuit is operable to select the first control signals to control the first transistor and the second transistor a specified time period after starting up the power regulator.

8. The control circuit of claim 7, wherein the specified time period is defined by the output voltage of the power regulator reaching a specified value.

9. The control circuit of claim 8, further comprising a fourth circuit operable to generate a first reference voltage, wherein a value of the first reference voltage is the specified value.

10. The control circuit of claim 9, wherein the fourth circuit is operable to generate one or more additional reference voltages and provide the one or more reference voltages to the second circuit for use by the second circuit in generating the first control signals.

11. A system for controlling a switching power regulator having an output stage that provides an output voltage, the system comprising:

a first circuit configured to generate burst-pulses; and a second circuit coupled to the first circuit and configured to selectively couple the burst-pulses to the output stage during start-up of the switching power regulator;

wherein the burst-pulses operate to ramp up the output voltage while limiting a current provided by the switching power regulator during start-up.

12. The system of claim 11, further comprising a third circuit coupled to the second circuit and configured to generate first control signals, wherein the second circuit is operable to selectively couple the first control signals to the output stage instead of coupling the burst-pulses to the output stage after the output voltage reaches a specified value;

wherein the first control signals operate to control the output voltage.

13. The system of claim 12, wherein the first circuit is operable to stop generating the burst-pulses after the output voltage reaches the specified value.

14. The system of claim 12, further comprising:

a third circuit configured to generate a first reference voltage having the specified value; and a fourth circuit coupled to the third circuit and operable to compare the first reference voltage with the output voltage to determine if the output voltage has reached the specified value.

15. The system of claim 14, wherein the third circuit is further configured to generate one or more additional reference voltages and provide the one or more reference voltages to the third circuit for use by the third circuit in generating the first control signals.

16. The system of claim 14, wherein the third circuit is operable to ramp up the one or more additional reference voltages to respective final values in specified voltage steps.

17. The system of claim 14, further comprising a fifth circuit configured to generate second control signals to control the first circuit and further configured to generate third control signals to control the third circuit.

18. The system of claim 17, wherein the third circuit is a DAC (digital-to-analog converter) comprising a decoder operable to generate internal control signals from at least a subset of the third control signals, wherein each of the one or more reference voltages provided by the DAC is selected from one of a plurality of different voltage values according to the internal control signals.

19. The system of claim 11, wherein the first circuit comprises:

an RC circuit having an output node, and an input node configured to receive a periodic signal;

a first logic gate having an output, and an input coupled to the output node of the RC circuit;

a second logic gate having a first input configured to receive the periodic signal, and a second input coupled to the output of the first logic gate;

wherein the second logic gate is operable to output the burst-pulses, wherein a width of the burst-pulses is determined by a time constant of the RC circuit.

20. The system of claim 19, further comprising a third circuit configured to generate second control signals to control the first circuit and further configured to generate third control signals to control the third circuit;

wherein at least a portion of the second control signals are used to program the time constant of the RC circuit to change the width of the burst-pulses.

* * * * *